United States Patent
Subramanian et al.

(10) Patent No.: US 10,768,820 B2
(45) Date of Patent: Sep. 8, 2020

(54) ON-DEMAND STORAGE PROVISIONING USING DISTRIBUTED AND VIRTUAL NAMESPACE MANAGEMENT

(71) Applicant: Samsung Electronics Co., Ltd., Suwon-si, Gyeonggi-do (KR)

(72) Inventors: Anand Subramanian, San Jose, CA (US); Chinnakrishnan Ballapuram, San Jose, CA (US); Oscar Prem Pinto, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/914,820

(22) Filed: Mar. 7, 2018

(65) Prior Publication Data

US 2019/0146675 A1    May 16, 2019

Related U.S. Application Data

(60) Provisional application No. 62/587,330, filed on Nov. 16, 2017.

(51) Int. Cl.
*G06F 3/06* (2006.01)
*G06F 12/109* (2016.01)
(Continued)

(52) U.S. Cl.
CPC .......... *G06F 3/0607* (2013.01); *G06F 3/0631* (2013.01); *G06F 3/0665* (2013.01);
(Continued)

(58) Field of Classification Search
None
See application file for complete search history.

(56) References Cited

U.S. PATENT DOCUMENTS 7,599,941 B2    10/2009   Bahar et al.
9,430,412 B2 *   8/2016   Huang ................ G06F 13/4221
(Continued)

OTHER PUBLICATIONS

"Strata: High-Performance Scalable Storage on Virtualized Nonvolatile Memory" Brendan Cully, Jake Wires, Dutch Meyer, Kevin Jamieson, Keir Fraser, Tim Deegan, Daniel Stodden, Geoffrey Lefebvre, Daniel Ferstay, and Andrew Warfield, Coho Data; 12th USENIX Conference on file and storage technologies (Year: 2014).*

*Primary Examiner* — Michael Alsip
(74) *Attorney, Agent, or Firm* — Innovation Counsel LLP

(57) ABSTRACT

A storage node in a cluster of storage nodes includes: one or more local storage devices; and a storage node controller. The storage node controller includes: a host interface configured to connect to an application running on a host computer; a storage manager configured to manage one or more virtual namespaces; and a storage device controller configured to manage respective namespace associated with the one or more storage devices. The storage manager is further configured to expand a storage space associated with a virtual namespace on demand on the one or more local storage devices of the storage node at a request of the application running on the host computer when the storage node has a sufficient storage space. the storage manager is further configured to communicate with a peer storage manager of a second storage node over a network and expand the storage space associated with the virtual namespace on demand on a local storage device of the second storage node at the request of the application running on the host computer when the storage node has an insufficient storage space.

20 Claims, 4 Drawing Sheets

(51) Int. Cl.
*H04L 29/08* (2006.01)
*G06F 12/02* (2006.01)

(52) U.S. Cl.
CPC ........ *G06F 12/109* (2013.01); *H04L 67/1097* (2013.01); *H04L 67/104* (2013.01)

(56) References Cited

U.S. PATENT DOCUMENTS

| | | |
|---|---|---|
| 9,495,478 B2 | 11/2016 | Hendrickson et al. |
| 2008/0155214 A1 | 6/2008 | Shitomi |
| 2010/0299306 A1 | 11/2010 | Agetsuma et al. |
| 2015/0248402 A1 | 9/2015 | Patternson, III et al. |
| 2016/0274806 A1 | 9/2016 | Barnes |
| 2017/0177222 A1* | 6/2017 | Singh ..................... G06F 3/061 |

* cited by examiner

ON-DEMAND STORAGE PROVISIONING USING DISTRIBUTED AND VIRTUAL NAMESPACE MANAGEMENT

CROSS-REFERENCE TO RELATED APPLICATION(S)

This application claims the benefits of and priority to U.S. Provisional Patent Application Ser. No. 62/587,330 filed Nov. 16, 2017, the disclosure of which is incorporated herein by reference in its entirety.

TECHNICAL FIELD

The present disclosure relates generally to data storage systems, more particularly, to a system and method for providing on-demand storage provisioning using distributed and virtual namespace management for data storage devices, in particular, NVMe-SSDs and their variants.

BACKGROUND

Applications running in a computer system can access data stored in non-volatile data storage devices such as solid-state drives (SSDs). In particular, a non-volatile memory express (NVMe)-based SSD is coupled to a host computer system via a Peripheral Component Interconnect express (PCIe) bus. Generally, an application cannot obtain an on-demand storage capacity increase from a non-volatile memory express (NVMe) SSD because the storage capacity of the NVMe SSD is limited to the capacity of the available physical flash capacity of the NVMe SSD.

Restrictions on the number of physical connections to a physical NVMe-SSD device also restrict device connection management and prevent exploitation of connection multiplexing and handling of a bunch of such flash devices in a cluster. The multiplexing of multiple NVMe connections to a group of devices (where each physical device can handle more than one connection) can help in improved scaling and performance across a tier of devices in the backend. In addition, the multiplexing can help in addressing issues of failover, failback, better namespace, or capacity provisioning at run-time as per application run-time requirements that cannot be predicted in advance. Allocation of the storage capacity in the NVMe SSD is largely static, and its physical storage capacity cannot be dynamically increased on-demand at run-time. The non-expandable storage capacity of the NVMe SSD prevents an application running at one node in a network from leveraging unused storage capacity in other peer NVMe SSDs in the same network. This can lead to over-provisioning of data at a local node or a physical host and over time can lead to severe over-provisioning of the data storage capacity across a data storage tier level in a datacenter increasing total cost of ownership (TCO) to operate the datacenter.

SUMMARY

According to one embodiment, a storage node in a cluster of storage nodes includes: one or more local storage devices; and a storage node controller. The storage node controller includes: a host interface configured to connect to an application running on a host computer; a storage manager configured to manage one or more virtual namespaces; and a storage device controller configured to manage respective namespace associated with the one or more storage devices. When the storage node has a sufficient storage space, the storage manager is further configured to expand a storage space associated with a virtual namespace on demand on the one or more local storage devices of the storage node at a request of the application running on the host computer. When the storage node has an insufficient storage space, the storage manager is further configured to communicate with a peer storage manager of a second storage node over a network and expand the storage space associated with the virtual namespace on demand on a local storage device of the second storage node at the request of the application running on the host computer.

According to another embodiment, a storage system includes: a plurality of host computers; and a plurality of storage nodes connected to the plurality of host computer over a network. The plurality of storage nodes includes a storage node comprising a storage node controller. The storage node controller includes: a host interface configured to connect to an application running on a host computer; a storage manager configured to manage one or more virtual namespaces; and a storage device controller configured to manage respective namespace associated with the one or more storage devices. When the storage node has a sufficient storage space, the storage manager is further configured to expand a storage space of the storage node associated with a virtual namespace on demand on the one or more local storage devices of the storage node at a request of the application running on the host computer. When the storage node has an insufficient storage space, the storage manager is further configured to communicate with a peer storage manager of a second storage node over a network and expand the storage space associated with the virtual namespace on demand on a local storage device of the second storage node at the request of the application running on the host computer.

The communication to a peer storage manager is based on shared (clustered or distributed) information (e.g., a metadata table shared from every node's storage manager process) indicating the state of its NVMe namespaces, available storage capacities, used up space, etc. The peer communication between the storage manager processes also handles keeping this metadata information up-to-date and in sync.

According to yet another embodiment, a method includes: allocating a storage space in a first storage device of a first storage node using a virtual namespace; receiving a write request to store data on the storage space from an application running on a host computer; determining that the allocated storage space has an insufficient storage space to store the data associated with the write request; expanding the storage space by including an additional storage space in the first storage node when the first storage node has a sufficient storage space to store the data; writing the data to the additional storage space in the first storage node; identifying a second storage node that has an additional storage space when the first storage node has an insufficient storage space to store the data; negotiating with the second storage node to allocate the additional storage space; expanding the storage space by including the additionally allocated storage space in the second storage node; writing the data to the additionally allocated storage space in the second storage node by peer-to-peer communication between the first storage node and the second storage node via the network; and updating a global mapping table to update mapping information of the virtual namespace.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
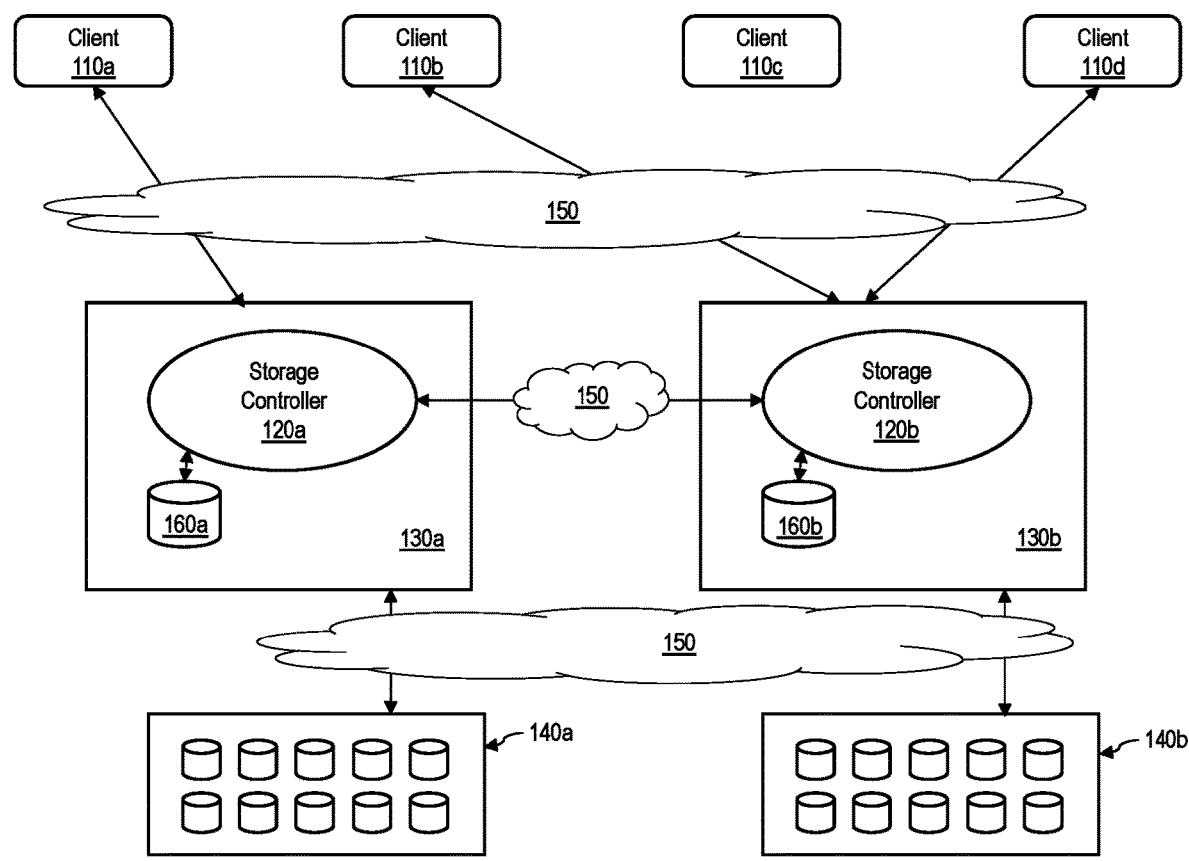
FIG. 1 illustrates a schematic diagram of an example framework that can provide on-demand storage provisioning, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a framework that enables on-demand storage provisioning and virtual namespace management. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

An application running on a host computer may demand device management and data storage provisioning for NVMe-based SSDs at run time. The restrictions on the on-demand device management and provisioning imposed by the requirement for physical connection between the host computer and the NVMe-based SSDs can be addressed by virtualizing the management of the NVMe-SSD devices/namespaces. The present disclosure describes a framework that can abstract the physical data storage devices (e.g., NVMe-SSD devices) from virtual disk entities (also called namespaces) consumed by an application. In particular, the device management and data provisioning can be optimized with respect to object or key-value (KV) stores using virtual disks and virtual namespaces in a distributed storage cluster forming the foundations of SSD-as-a-Service (SaaS).

The present framework can create and extend storage NVMe namespaces used by an application on-demand and provide dynamic and continuous provisioning of a storage space. The present framework can handle the storage of objects/KV in a distributed storage cluster in an elastic, on-demand provisioned way and optimizes disk usage by managing virtual disks and virtual namespaces. The present framework can be exported as an SSD-as-a-Service model in a cloud environment or a datacenter.

The present framework aggregates NVMe SSDs across a cluster of storage nodes over a network (e.g., fabric network such as Ethernet, Fibre Channel, and Infiniband) and serves virtual disks to an application on-demand. These virtual disks can be mapped to physical disks through a virtual namespace mapping. Thus, a virtual disk could map to a virtual namespace that could map to a physical disk or namespace itself. The mapping could be 1:1:1 or 1:M:N. The present framework dynamically (or elastically) and automatically extends a virtual disk capacity by intelligently managing and virtualizing distributed disks and their namespaces across multiple storage nodes. In one embodiment, the present framework manages distributed NVMe-SSD devices and their namespaces in an application in a manner oblivious to the application to store and retrieve object/KV data. The present framework can be extended to handle or include other services such as High Availability (HA), replication and other storage services as it can handle both the data and the management planes. Hence, the present framework can be used to export SSD-as-a-service in a cloud and a datacenter.

Currently available NVMe disks allow only one NVMe-oF connection to each namespace. The current framework removes this limitation by virtualizing or abstracting the physical NVMe disks and namespaces. Multiple connections across multiple NVMe-oF devices can be useful for datacenter applications to provide distributed storage features or services such as High Availability (HA), Failover, and Disaster Recovery, etc.

According to one embodiment, the present framework provides a storage node controller on each storage node or a node that is designated to accept and/or intercept connections to backend NVMe SSDs. The storage node controller of the storage node or the designated node for multiple backend NVMe SSDs can communicate with another peer storage node controller on different nodes in the same cluster of storage nodes or a storage pool. The storage node controller may be implemented as a device/node-level, lightweight, thin software stack (or module) that can facilitate connection with a requesting application and underlying NVMe SSDs and other storage node controllers in the same cluster. The peer-to-peer communication among storage node controllers may be over a fabric network such as Ethernet, Fibre Channel, and Infiniband.

According to one embodiment, the present framework intercepts an NVMe/NVMe-oF request issued by an application running on a host computer to one or more target NVMe SSDs or namespaces in the backend and replies to the application with its own virtual namespace encapsulation. Here, the NVMe-oF request is an example of any data path request issued by the application to the target NVMe SSDs or namespaces and can encompass NVMe commands via a physical connection (i.e., PCIe connection). The data path request can include both I/O commands and admin commands. Since the present framework removes an overhead for the application to establish and manage connections to NVMe SSDs, the present framework can support not only physical connection but also logical connection via virtual namespace encapsulation. In addition, the present framework can support any number of connections (virtual connections) to the backend NVMe SSDs without being limited to the available number of physical connections. In the case of NVMe requests, only one physical connection to each NVMe SSDs is available via the PCIe bus.

The present framework can efficiently establish and manage connections with one or more backend NVMe SSDs on demand. The present framework provides communication protocols among peer storage node controllers across a cluster of storage nodes and can establish connections to any backend NVMe SSDs that may be scattered across the cluster. In addition, the present framework can handle input/output (I/O) paths asynchronously via separate, lightweight, fast, and concurrent threads or tasks that can be scheduled in a user-space of an application and operate on I/O queues that are designated for input and output separately for each backend NVMe SSD. The actual I/O data path can involve other optimizations depending on the actual implementation and operating environment. For example, the I/O data path of the present framework can be optimized for direct device access from a user-space without the involvement of the kernel or kernel-mode drivers and user-mode disk I/O scheduling.

FIG. 1 illustrates a schematic diagram of an example framework that can provide on-demand storage provisioning, according to one embodiment. A plurality of client applications 110a-110d are running on one or more host computers (not shown). In one embodiment, each client application 110 connects to a node 130 based on its physical connection. For example, client 110a connects to the node 130a, and clients 11b and 110d connect to the node 130b. In another embodiment, the connection between the client 110 and the node 130 may be over a fabric network 150 such as Ethernet, Fibre Channel, and Infiniband. Each node 130 has a storage controller 120 that can establish and manage connections to a local storage device 160. The local storage device 160 may be connected to the node 130 via a PCIe bus. In addition, the storage controller 120 can further establish and manage connection to one or more backend storage devices 140 via a network connection. The connection between the node 130 and the backend storage devices 140 may be via the same fabric network as the fabric network 150 that connects the clients 110 to the nodes 130. The storage controllers 120 of the nodes 130 can communicate with each other 150 via an inter-node communication path that can be established over the fabric network 150 or can be an independent back-channel that guarantees minimal network latencies.

Figure 2:
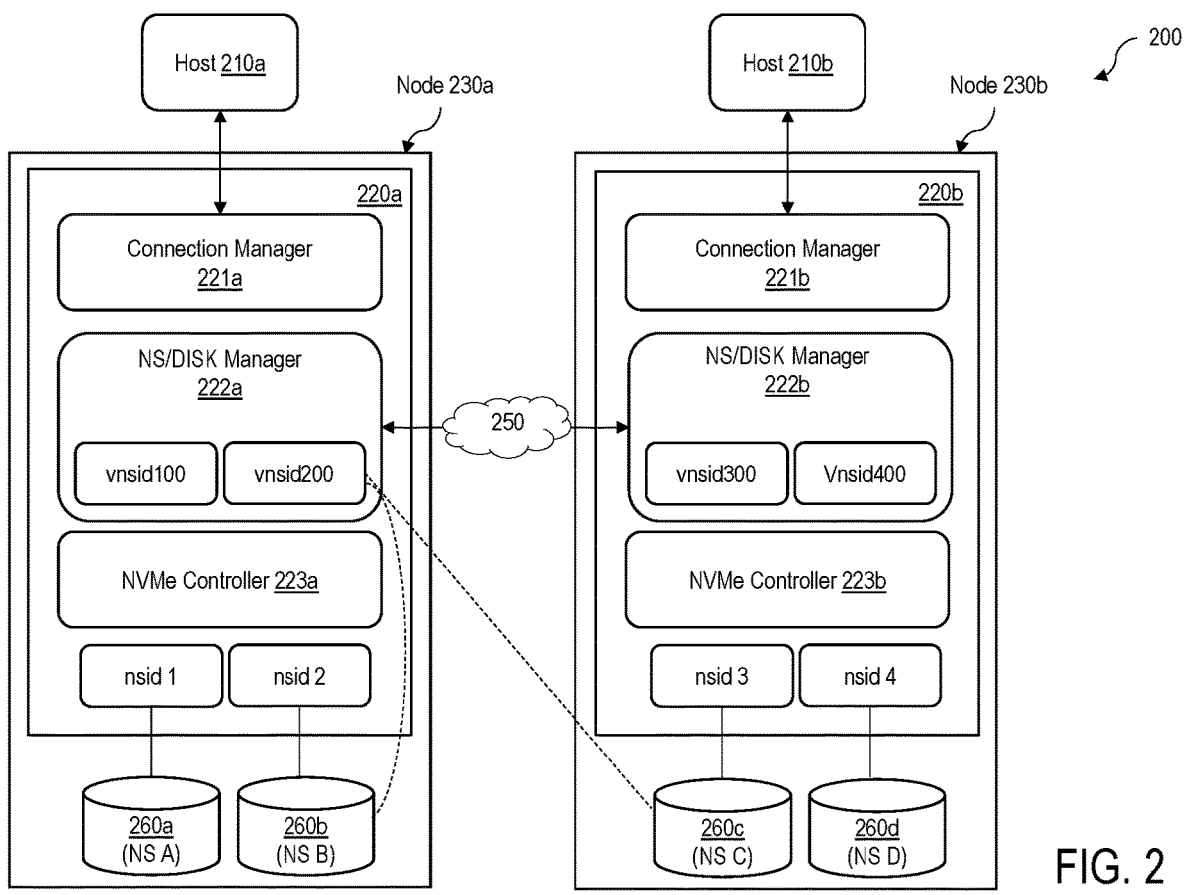
FIG. 2 illustrates a block diagram of an example framework, according to one embodiment.

FIG. 2 illustrates a block diagram of an example framework, according to one embodiment. The framework 200 includes a plurality of hosts 210 including host 210a and host 210b and a plurality of storage nodes 230 including node 230a and node 230b. Each of the hosts may be connected to at least one storage node 230 locally via a PCIe bus or remotely via a network 250. When the host 210 and storage node 230 are connected via a PCIe bus, the host 210 and the coupled storage node 230 may reside in the same rack in a datacenter.

The storage node 230 includes a storage node controller 220 and one or more local storage devices 260. Among a plurality of nodes 230 in a cluster of storage nodes, each storage node 230 can have a storage node controller 220. In some embodiment, the storage node 230 may be designated to provide services to manage the connected physical disks 260 (e.g., backend NVMe SSDs) and their associated namespaces.

Each storage node controller 220 includes a host connection manager 221, a namespace(NS)/disk manager 222, and an NVMe controller 223. The host connection manager 221 manages connection between applications running on the host 210 and the node 230 locally or over the network 250.

The host connection manager 221 processes and provides a request received from a client application to the NS/disk manager 222. Herein, the NS/disk manager 222 may be referred to as a storage device manager or a virtual namespace manager because it can manage connection to a network-connected storage device on a remote node using a virtual namespace. For example, the host connection manager 221 intercepts NVMe-oF requests from the client application and provides those NVMe-oF requests to the NS/disk manager 222 for further processing. The NS/disk manager 222 manages establishment of connections to one or more backend NVMe SSDs 260 and mapping to one or more virtual namespaces of the backend NVMe SSDs 260 that may be local or remote over a fabric network in the same cluster. The mapping to the virtual namespaces of a remote backend SSD 260 may be done via a peer-to-peer connection between two NS/disk managers 222.

The NVMe controller 223 can establish, control, and manage the connection and the I/O data path to the attached backend NVMe SSDs 260 and assign a namespace identifier (nsid). After the connection is established, the NVMe controller 223 can route I/O data to and from the namespaces using the namespace identifier.

Herein, a namespace NS refers to a list of logical block addresses (LB As) addressable to a respective NVMe SSD 260. In the present example, the node 230a includes one or more NVMe SSDs 260a and 260b that are addressable by their namespaces NS A and NS B using their unique identifiers nsid1 and nsid2. Similarly, the node 230b includes one or more NVMe SSDs 260c and 260d that are addressable by their namespaces NS C and NS D using their identifiers nsid3 and nsid4.

According to one embodiment, the NS/disk manager 222 can virtually map one or more storage devices 260 and their namespaces that may be associated with them to a different node using the present framework 200. The virtually mapped namespaces are herein referred to as virtual namespaces VNS. To support the association between namespaces NS of the NVMe SSDS and virtual namespaces VNS, the NS/disk manager 222 can establish, control, and manage virtual namespaces that may be associated with NVMe SSDs 260 of a specific node 220 that may be local or remote to the node 220. In comparison, the NVMe controller 223 can establish, control, and manage namespaces that are associated with the local NVMe SSDs 260 that are physically connected. The NS/disk manager 222 manages the virtual namespaces independently from the namespaces NS that are managed by the NVMe controller 223 although a virtual namespace can map to one or more namespaces that may distributed across the cluster.

The NS/disk manager 222 can associate the namespace NS of an NVMe SSD 260 with one or more virtual namespaces depending on the configuration and virtualization scheme of an operating system of the host 210. Using the virtual namespace mapping capability of the NS/disk manager 222, the present framework 200 can elastically expand or shrink a storage space on demand at a request from an application.

In the present example, the NS/disk manager 222a maps the virtual namespace vnsid200 onto two distributed namespaces NS B and NS C. The namespace NS B is physically attached to the NVMe controller 223a of the node 220a whereas the namespace NS C is physically attached to the NVMe controller 223b of the node 220b. The storage node controller 220a can internally manage the mappings (including virtual mapping) by using distributed metadata over the fabric network 250. Because the virtual mapping and distributed storage establishment and connections are performed via peer NS/disk managers 222, the mapping to virtual namespaces by the present framework 200 is invisible to the host 210 (or a client application running on the host 210) or the backend NVMe SSDs 260.

The distributed metadata may be stored in a metadata table accessible by the NS/disk managers 222. The global metadata table stores information of use/free/available space at a per-host level, for all disks/namespaces at the host. The metadata table can be kept as a global or shared information at the cluster level. The updates to the metadata table may not be too frequent as space requests are not that frequent. In the present example, the NS/disk manager 222a looks up the metadata table to ascertain the availability of a necessary disk space across the cluster and sends a request to the NS/disk manager 222b to map the namespace NS C.

The present framework 200 unifies a set of NVMe SSDs 260 across the distributed network 250 as a single pool of storage, elastically expands or shrinks virtual namespaces depending on a requested storage capacity, and presents a virtual disk or a virtual namespace to a client application. The present framework 200 can establish multiple connections on demand to remote storage devices and their virtual namespaces and internally manage the connections using a network of NS/disk managers 222. Each NS/disk manager 222 may be device/node-level, light-weight, thin software stack (or module) that is deployed to the nodes that manage the physical connection to the attached NVMe SSDs 260.

Although the present example shows two hosts 210 and two nodes 230, it is understood that any number of hosts and nodes may be present in the cluster of storage nodes. In addition, the present example shows that each node 230 includes to NVMe SSDs 260, and each NVMe SSD 260 is addressable by its unique namespace identifier, it is understood that any number and type of storage devices may be present in each node 230. For example, the storage device 260 may be an NVMe SSD or an NVMe-oF SSD.

Figure 3:
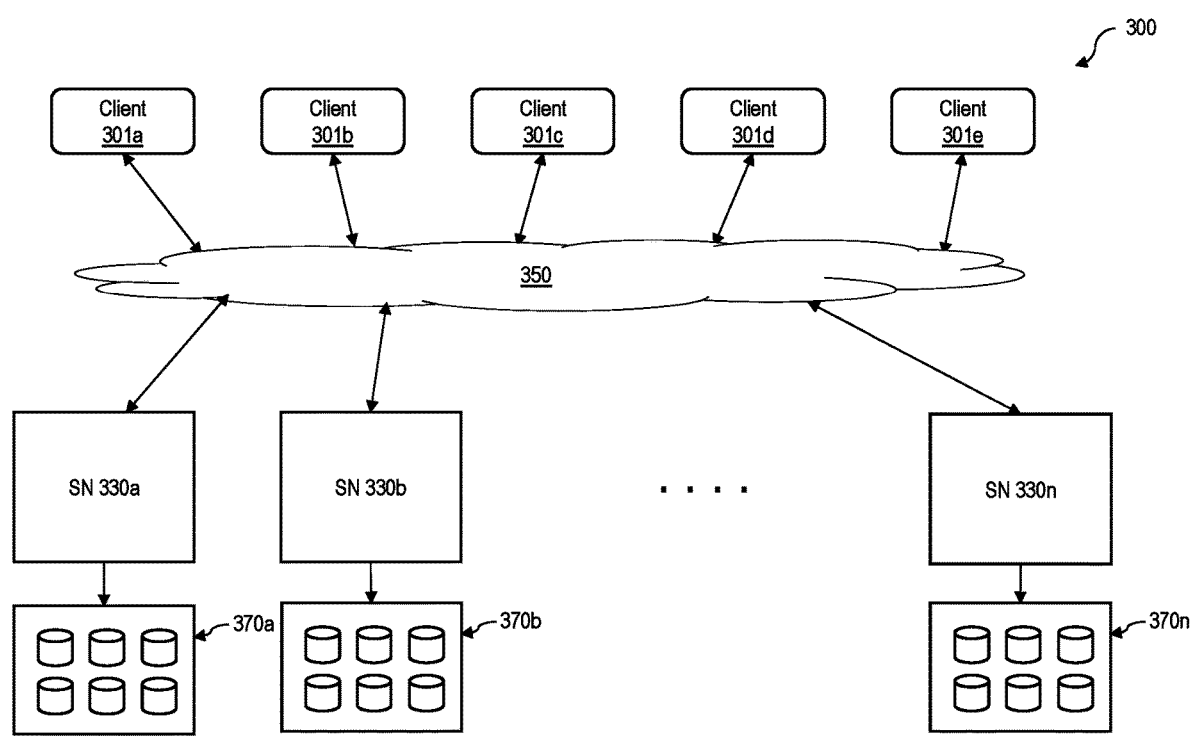
FIG. 3 shows a block diagram of an example storage system, according to one embodiment.

FIG. 3 shows a block diagram of an example storage system, according to one embodiment. The storage system 300 employs the present framework to facilitate provisioning of a storage space between a client application 301 running on a host computer (not shown) and a plurality of storage nodes 330 or storage devices 370. A storage node 330 includes a storage node controller (e.g., storage node controllers 220a and 220b of FIG. 2) that can control one or more storage devices 370 of the storage node 330. Each storage node controller can be connected to the other storage node controllers through a fabric network 350 (which may also be referred to as a back-channel or internal communication network or a management channel). Each storage node controller can export mount points for the client applications 301 to mount and initiate regular block reads/writes and object/KV stores on the distributed storage devices 370. The exported mount point is identified by a mapping of virtual namespaces to the actual physical namespace that is attached to a physical storage device in the backend either directly attached to the storage node controller itself or in another peer storage node 330 via the fabric network 350. Each virtual namespace has a unique virtual namespace identifier vnsid. The allocation of the virtual namespace identifiers can be done by consensus with the peer storage controllers in the storage system 300. The allocation and distribution of the virtual namespace identifiers can be handled dynamically when a connection request arrives or can be computed a priori. The consensus algorithm can be any generic distributed consensus algorithm known to the art, or can be a simple identifier located in a virtual namespace table and accessed by all storage controller controllers via a shared storage or simply distributed or copied to every storage node once it is updated atomically by any single storage node controller that is a part of the storage system 300.

For example, a mount point/mnt/nvme0n1 has a virtual namespace table including a set of vnsids,

```
{   vnsid1=(IP addr1, nsid-xyz),
    vnsid2=(IP addr2, nsid-xyz),
    vnsid2=(IP addr3, nsid-xyz)
}.
```

The vnsids can also be created utilizing the controllerID-NSID and associated with the IP address to aid in controller migration. In yet another embodiment, the vnsids can be created utilizing the SubsystemlD that includes NVMe controllers and their namespaces. The vnsids may also be created by inference.

The mapping table can be expanded on-demand as new NVMe-oF SSDs are added or removed to the mount point to easily create a larger storage space, without affecting the client applications. A client application can request a namespace of an initial capacity, and a storage node controller can increase or shrink the initial storage capacity on demand as the client application consumes the initially allocated capacity. An interface/application programming interface (API) option can be passed to the framework at a connection setup time and/or further as a part of an extended NVMe command set. The present framework can fail a client application that tries to write beyond the initially negotiated capacity or handle a write request by expanding the namespace at runtime (oblivious to the requesting application).

According to one embodiment, the present framework can coordinate communications among peer storage controllers to ensure that the allocated virtual namespace identifiers are unique. In addition, the framework can handle complexities that may arise when a data storage space (or object or key-value) is allocated or written to a particular namespace, and the data storage space can be extended across a different physical storage node by virtual addition of one or more physical namespaces, through the global metadata and mapping table mechanisms.

According to one embodiment, the present framework can handle object requests (read/write) across virtual namespaces. For example, an application connects to a storage node 1 (SN1), and a storage node controller of the storage node SN1 allocates a virtual namespace denoted by vnsid100 to the application. During the allocation of the virtual namespace vnsid100, the storage node controller can create a large object VLOB_100 that may span across the virtual namespace vnsid100 filling up an initially allocated storage space. The allocation of the virtual namespace can be done by the application by invoking an API command, for example, "PUT key-vlob100". The object VLOB_100 can reside entirely on the storage node SN1 on either a local direct attached storage (DAS) or partly on another physical storage device of a remote storage node. The storage node controller handles the creation and management of the virtual namespace and the allocation of the object VLOB_100 on demand to one or more constituent drive namespaces. After allocating the object VLOB_100, the storage node controller communicates with the application for informing that the object VLOB_100 has been successfully allocated, and the application updates the object VLOB_100 on an application side, and starts to use the allocated storage space.

While using the initially allocated space, the application may entirely consume the initially allocated storage space. In this case, an object put command by the application that translates to a copy-on-write (COW) command on the underlying storage device may return an error (e.g., ENOSPACE). The storage node controller may intercept and handles the error by allocating an additional storage space.

The storage node controller can extend the namespace by allocating another namespace and attaching it to the current namespace (being written to). For example, the previous vnsid=(IPaddr1, nsid-nvme0) can be updated as vnsid100={(IPaddr1, nsid-nvme0), (IPaddr2, nsid-nvme9)} by allocating an additional storage space in the storage node SN2 with IP address IPaddr2. After negotiation with the storage node SN2, the object VLOB_100 can be expanded across a physical storage device that belongs to the storage node SN2, and the overflowing content of VLOB_100 can be written to the physical storage device available in the storage node SN2. The physical namespace nsid-nvme9 maps to the physical storage device denoted by nvme9 of the local storage node SN2.

Other commands such as READs or GETs of objects or KV data can follow a substantially similar procedure. A global mapping table stores the updated virtual namespace identifiers. A vnsid lookup in the global mapping table indicates the mapping information for a particular object. Parallel reads can be performed to read all chunks of the object across the storage nodes or their namespaces making up the virtual namespace. Global metadata can be kept in a distributed fashion by the present framework.

In a case where the same application or different applications requests data associated with the object VLOB_100, the present framework has the intelligence to return the latest copy of VLOB_100 to a requesting application from across the cluster. The framework can do so by versioning each object with a version-stamp along with a timestamp. For example, a first copy (now stale) of VLOB_100 on (IPaddr1, nsid-nvme0) is marked for deletion, the storage node SN1 attempts to delete the local copy of the VLOB_100 at garbage collection (unless the application sent a TRIM command via an explicit DELETE object request). Once the storage node SN1 completes the garbage collection (GC), the storage node SN1 completely erase the first copy of VLOB_100, and the framework updates the cluster-internal location of VLOB_100 as (IPaddr2, nsid-nvme9).

Figure 4:
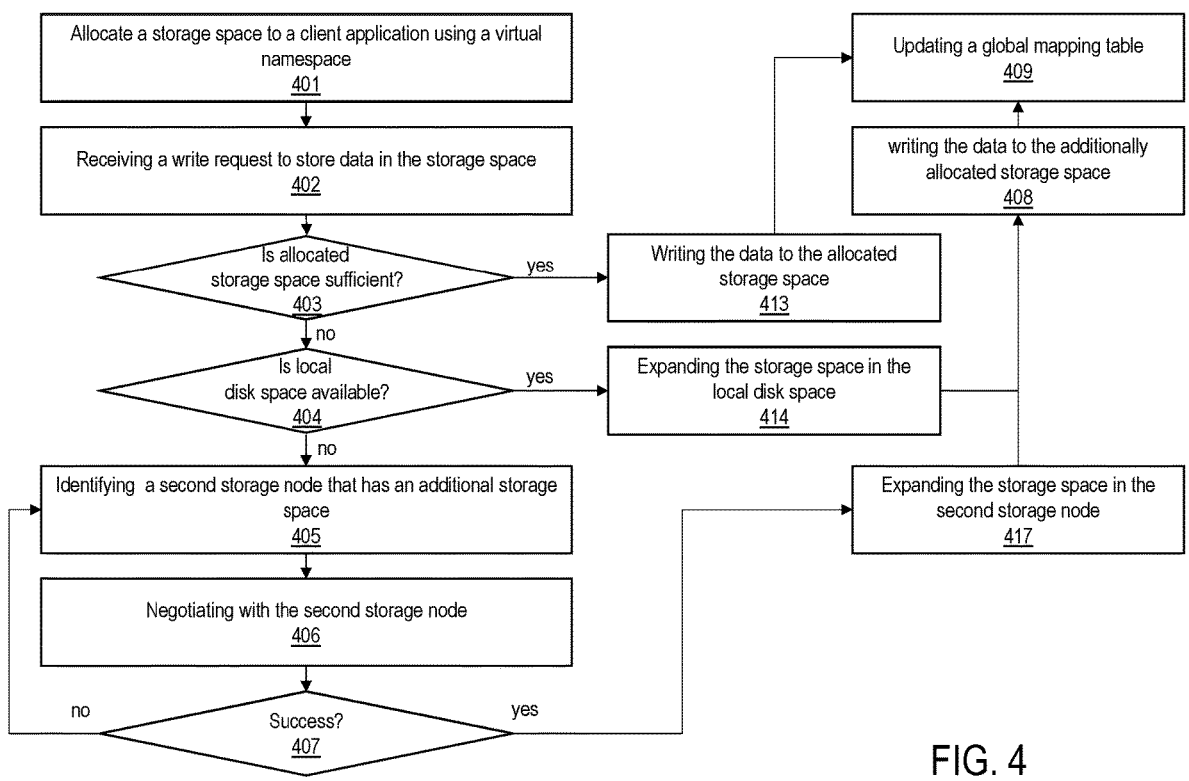
FIG. 4 is a flowchart for dynamically allocating a storage space in a cluster of storage nodes, according to one embodiment.

FIG. 4 is a flowchart for dynamically allocating a storage space in a cluster of storage nodes, according to one embodiment. A client application requests a namespace of an initial storage capacity to a first storage node. In response, a storage manager of the first storage node allocates a storage space in a first storage device of the first storage node and assign a virtual namespace to the allocated storage space (401). The storage manager receives a write request from the client application to store data on the storage space (402). The initially allocated storage space in the first storage device may be insufficient to store the data. In this case, the storage manager checks if the currently allocated storage space has a sufficient storage space to store the data associated with the write request (403). If the allocated storage space is sufficient, the storage manager writes the data to the allocated storage space (413) and updates a global mapping table accordingly (409), otherwise, the storage manager further checks if the associated storage node (first storage node) has a local disk space to write the data (404). If an additional local disk space is available, the storage manager expands the storage space in the local disk space (414), write the data to the additionally allocated storage space in the local disk space (408), and updates the global mapping table accordingly (409). If no local disk space is available, the storage manager identifies a second storage node that has an additional storage space by looking up the global mapping table (405). Because the storage managers of the storage system can communicate with each other via an established network, any storage manager can have information regarding the availability of additional storage space in other storage nodes in the same cluster. The storage manager of the first storage node negotiates with the storage manager of the second storage node to allocate the additional storage space (406). If the negotiation is successful (407), the storage manager of the first storage node expands the initially allocated storage space to include the additionally allocated storage space in the second storage device of the second node (417). If the negotiation fails, the storage manager of the first storage node communicates with other storage nodes to expand the storage space. The storage manager of the first storage node writes the data to the additionally allocated storage space in the second storage node by peer-to-peer communication between the first storage node and the second storage node via the network (408) and updates a global mapping table to update mapping information of the virtual namespace (409).

The present framework assumes that each object hashes to a range that ensures such an object is handled only by only one storage node SN in the cluster. This consistent hash algorithm is known to all storage nodes in the cluster, so any request for VLOB_100 is directed to SN1 in the above example thereby ensuring strict consistency for object data reads. The present framework can expand and replicate objects across multiple storage nodes in the cluster over a fabric network and further cache objects at the replicas and invalidate objects at the designated replicas to improve performance and availability.

According to one embodiment, a storage node in a cluster of storage nodes includes: one or more local storage devices; and a storage node controller. The storage node controller includes: a host interface configured to connect to an application running on a host computer; a storage manager configured to manage one or more virtual namespaces; and a storage device controller configured to manage respective namespace associated with the one or more storage devices. When the storage node has a sufficient storage space, the storage manager is further configured to expand a storage space associated with a virtual namespace on demand on the one or more local storage devices of the storage node at a request of the application running on the host computer. When the storage node has an insufficient storage space, the storage manager is further configured to communicate with a peer storage manager of a second storage node over a network and expand the storage space associated with the virtual namespace on demand on a local storage device of the second storage node at the request of the application running on the host computer.

The one or more local storage devices may be connected to the storage node controller via a PCIe bus.

The one or more local storage devices may be non-volatile memory express (NVMe) devices.

The network may be a fabric network.

The fabric network may be one of Ethernet, Fibre Channel, and Infiniband.

The storage manager may update a global mapping table to update the virtual namespace after the storage space is expanded to the second storage node.

The virtual namespace may be entirely or partially mapped to at least one storage device of the second storage node, and a request to access data stored on the at least one storage device of the second storage node may be processed by a peer-to-peer communication between the storage manager of the storage node and the peer storage space manage of the second node.

The data stored in the storage space may be an object or key-value (KV) data.

According to another embodiment, a storage system includes: a plurality of host computers; and a plurality of storage nodes connected to the plurality of host computer over a network. The plurality of storage nodes includes a storage node comprising a storage node controller. The storage node controller includes: a host interface configured to connect to an application running on a host computer; a storage manager configured to manage one or more virtual namespaces; and a storage device controller configured to manage respective namespace associated with the one or more storage devices. When the storage node has a sufficient storage space, the storage manager is further configured to expand a storage space of the storage node associated with a virtual namespace on demand on the one or more local storage devices of the storage node at a request of the application running on the host computer. When the storage node has an insufficient storage space, the storage manager is further configured to communicate with a peer storage manager of a second storage node over a network and expand the storage space associated with the virtual namespace on demand on a local storage device of the second storage node at the request of the application running on the host computer.

The storage system may further include a global mapping table to update the virtual namespace after the storage space is expanded to the second storage node.

The local storage device of the second storage node may be connected to the second storage node controller via a PCIe bus.

The local storage device of the second storage node may be a non-volatile memory express (NVMe) device.

The network may be a fabric network.

The fabric network may be one of Ethernet, Fibre Channel, and Infiniband.

The data stored in the storage space may be an object or key-value (KV) data.

According to yet another embodiment, a method includes: allocating a storage space in a first storage device of a first storage node using a virtual namespace; receiving a write request to store data on the storage space from an application running on a host computer; determining that the allocated storage space has an insufficient storage space to store the data associated with the write request; expanding the storage space by including an additional storage space in the first storage node when the first storage node has a sufficient storage space to store the data; writing the data to the additional storage space in the first storage node; identifying a second storage node that has an additional storage space when the first storage node has an insufficient storage space to store the data; negotiating with the second storage node to allocate the additional storage space; expanding the storage space by including the additionally allocated storage space in the second storage node; writing the data to the additionally allocated storage space in the second storage node by peer-to-peer communication between the first storage node and the second storage node via the network; and updating a global mapping table to update mapping information of the virtual namespace.

The method may further include: intercepting an error from a storage device controller of the first storage node; and identifying that the second storage node has the additional storage space.

The method may further include: parallelly accessing the first storage device of the first storage node and the second storage device of the second storage node.

The method may further include: invalidating data stored in the first storage device; deleting a local copy of the data stored in the first storage device; and updating the virtual namespace to map to the second storage device of the second storage node.

The data stored in the storage space may be an object or key-value (KV) data.

The above example embodiments have been described hereinabove to illustrate various embodiments of implementing a system and method for providing on-demand storage provisioning using distributed and virtual namespace management and handling object read and write operations by the framework in conjunction with virtual namespace management and extensions across physical storage nodes in a distributed manner. Various modifications and departures from the disclosed example embodiments will occur to those having ordinary skill in the art. The subject matter that is intended to be within the scope of the invention is set forth in the following claims.

What is claimed is:

1. A storage node comprising:
one or more local storage devices; and
a storage node controller comprising:
a host interface configured to connect to a client application running on a host computer;
a storage manager configured to manage one or more virtual namespaces; and
a storage device controller configured to access the one or more local storage devices and manage respective namespace associated with the one or more storage devices,
wherein the storage manager is further configured to provide mapping the one or more virtual namespaces to the respective namespace associated with the one or more storage devices,
wherein the storage manager is further configured to determine that a current storage space associated with a virtual namespace used by the client application is insufficient to store data in response to a request by the client application and expand the storage space associated with the virtual namespace on the one or more local storage devices of the storage node based on consumption of the current storage space by the client application, and
wherein the storage manager is further configured to determine that the storage node has an insufficient storage space, communicate with a peer storage manager of a second storage node over a network, and expand the storage space associated with the virtual namespace used by the client application on a local storage device of the second storage node in addition to the current storage space allocated in the storage node.

2. The storage node of claim 1, wherein the one or more local storage devices are connected to the storage node controller via a PCIe bus.

3. The storage node of claim 2, wherein the one or more local storage devices comprise non-volatile memory express (NVMe) devices.

4. The storage node of claim 3, wherein the network comprises a fabric network.

5. The storage node of claim 4, wherein the fabric network comprises at least one of an Ethernet network, a Fibre Channel network, or an Infiniband network.

6. The storage node of claim 1, wherein the storage manager updates a global mapping table to update the virtual namespace based on the storage space being expanded to the second storage node.

7. The storage node of claim 1, wherein the virtual namespace is at least partially mapped to at least one storage device of the second storage node, and wherein a request to access data stored on the at least one storage device of the second storage node is processed by a peer-to-peer communication communicatively coupled to the peer storage manager of the second node.

8. The storage node of claim 1, wherein the data stored in the storage space comprises an object or key-value (KV) data.

9. A storage system comprising:
a host computer; and
a plurality of storage nodes connected to the host computer over a network,
wherein the plurality of storage nodes includes a storage node comprising one or more local storage devices and a storage node controller,
wherein the storage node controller comprises:
a host interface configured to connect to a client application running on the host computer;
a storage manager configured to manage one or more virtual namespaces; and
a storage device controller configured to access the one or more local storage devices of the storage node and manage respective namespace associated with the one or more storage devices,
wherein the storage manager is further configured to provide mapping the one or more virtual namespaces to the respective namespace associated with the one or more storage devices,
wherein the storage manager is further configured to determine that a current storage space associated with a virtual namespace used by the client application is insufficient to store data in response to a request by the client application and expand the storage space of the storage node associated with the virtual namespace on the one or more local storage devices of the storage node based on consumption of the current storage space by the client application, and
wherein the storage manager is further configured to determine that the storage node has an insufficient storage space, communicate with a peer storage manager of a second storage node over a network and expand the storage space associated with the virtual namespace used by the client application on a local storage device of the second storage node in addition to the current storage space allocated in the storage node.

10. The storage system of claim 9, further comprising a global mapping table to update the virtual namespace based on the storage space being expanded to the second storage node.

11. The storage system of claim 9, wherein the local storage device of the second storage node is connected to the second storage node controller via a PCIe bus.

12. The storage system of claim 11, wherein the local storage device of the second storage node comprises a non-volatile memory express (NVMe) device.

13. The storage system of claim 12, wherein the network comprises a fabric network.

14. The storage system of claim 13, wherein the fabric network comprises at least one of an Ethernet network, a Fibre Channel network, or an Infiniband network.

15. The storage system of claim 9, wherein the data stored in the storage space comprises an object or key-value (KV) data.

16. A method comprising:
allocating a storage space associated with a virtual namespace in a first storage device of a first storage node;
receiving a write request to store data on the storage space from a client application running on a host computer;
determining that the storage space allocated in the first storage device has an insufficient storage space to store the data associated with the write request;

in response to the write request, expanding the storage space associated with the virtual namespace on the first storage device based on current consumption of the storage space in the first storage device that is used by the client application by allocating an additional storage space in the first storage node to store the data;

writing the data to the additional storage space in the first storage node;

identifying a second storage node that has an additional storage space to store the data by determining that the first storage device has insufficient storage space;

negotiating with the second storage node to allocate the additional storage space;

expanding the storage space associated with the virtual namespace by allocating the additional storage space in the second storage node;

writing the data to the additional storage space in the second storage node by peer-to-peer communication between the first storage node and the second storage node via the network; and updating a global mapping table to update mapping information of the virtual namespace.

17. The method of claim 16, further comprising: intercepting an error from a storage device controller of the first storage node; and identifying that the second storage node has the additional storage space.

18. The method of claim 16, further comprising: parallelly accessing the first storage device of the first storage node and the second storage device of the second storage node.

19. The method of claim 16, further comprising: invalidating data stored in the first storage device; deleting a local copy of the data stored in the first storage device; and updating the virtual namespace to map to the second storage device of the second storage node.

20. The method of claim 16, wherein the data stored in the storage space comprises an object or key-value (KV) data.

* * * * *